United States Patent [19]

Simms

[11] Patent Number: 4,860,177
[45] Date of Patent: Aug. 22, 1989

[54] BICYCLE SAFETY LIGHT

[75] Inventor: John B. Simms, 4518 E. Arapahoe, Phoenix, Ariz. 85044

[73] Assignees: John B. Simms; Georgene M. Simms, both of Phoenix, Ariz.

[21] Appl. No.: 147,888

[22] Filed: Jan. 25, 1988

[51] Int. Cl.⁴ .......................... B62U 6/00; F21V 33/00
[52] U.S. Cl. ...................................... 362/72; 362/800;
340/432; 340/472; 315/76
[58] Field of Search ................. 362/72, 800, 191, 194,
362/205; 340/134, 82; 315/76, 185 R, 185 S

[56] References Cited

U.S. PATENT DOCUMENTS

| | | | |
|---|---|---|---|
| 1,848,235 | 3/1932 | Wiley | 362/72 X |
| 3,493,739 | 2/1970 | Lipski | 362/72 |
| 4,019,171 | 4/1977 | Martelet | 362/72 X |
| 4,264,845 | 4/1981 | Bednarz | 362/800 X |
| 4,271,408 | 6/1981 | Teshima et al. | 362/800 X |
| 4,306,716 | 12/1981 | James et al. | 362/800 X |
| 4,308,572 | 12/1981 | Davidson et al. | 362/800 |
| 4,602,191 | 7/1986 | Darula | 362/800 X |
| 4,654,462 | 3/1987 | Bezos et al. | 362/800 X |
| 4,733,335 | 3/1908 | Serizawa et al. | 362/800 X |

Primary Examiner—Ira S. Lazarus
Assistant Examiner—Peggy Neils
Attorney, Agent, or Firm—Richard R. Mybeck

[57] ABSTRACT

A bicycle safety light which improves the visibility of the bicycle and rider in low light conditions via a constantly moving and converging pattern of light rows which visually direct and emphasize to a following viewer the center position of the rider and the bicycle.

13 Claims, 1 Drawing Sheet

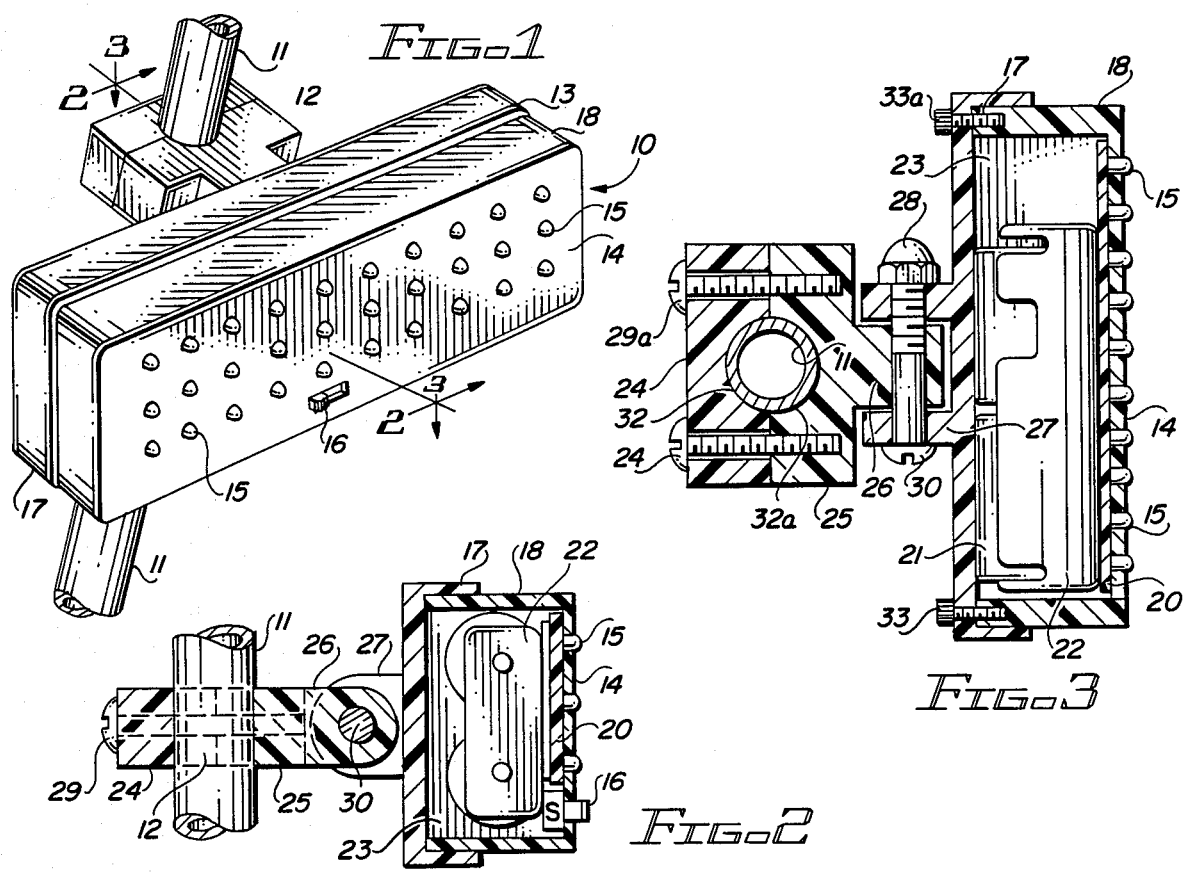
*Fig. 1*
*Fig. 2*
*Fig. 3*
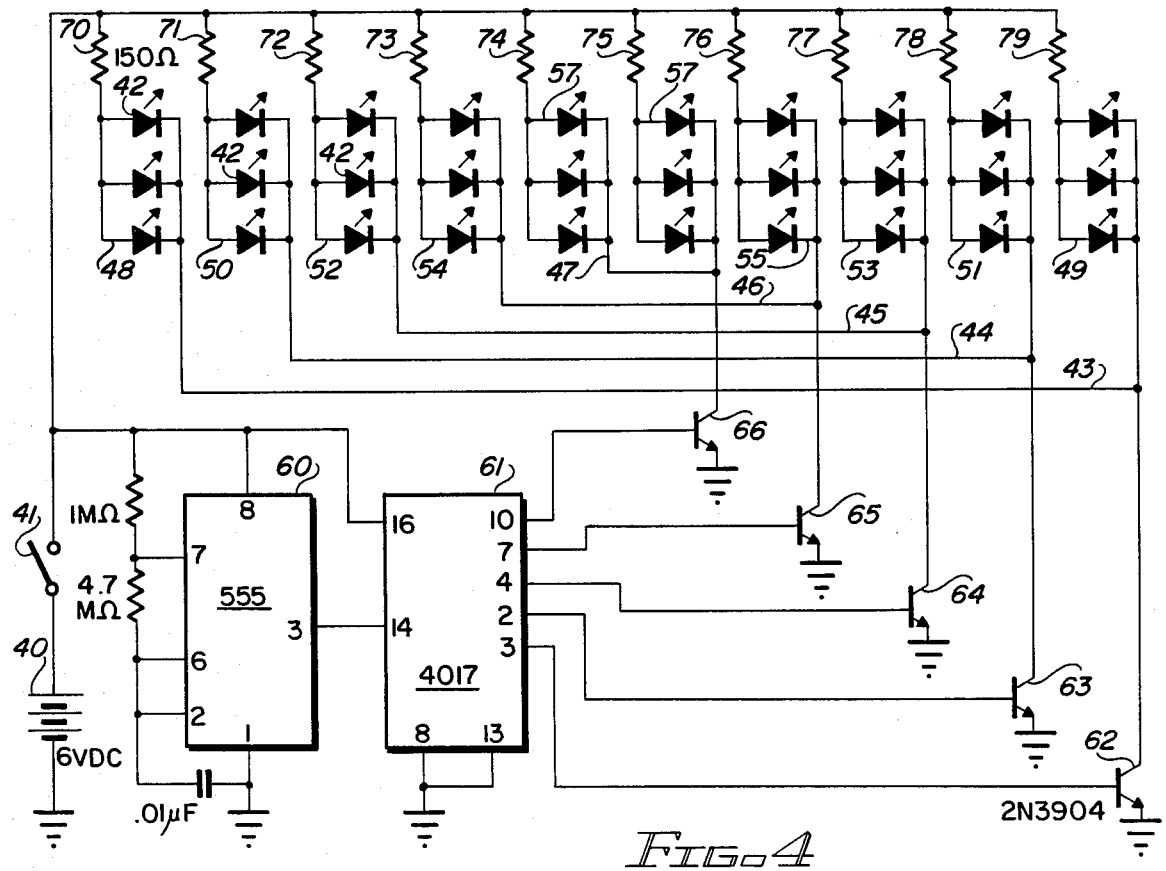
*Fig. 4*

BICYCLE SAFETY LIGHT

INTRODUCTION

This invention relates to bicycle lights and more particularly to a rear-mounted flashing bicycle light having a battery-powered, reciprocally converging, sequentially patterned light-emitting diode (LED) display which improves the visibility of a bicycle to following traffic.

BACKGROUND OF THE INVENTION

With the exception of areas having designated bicycle paths, bicycle riders are forced to share streets with faster, larger and more powerful vehicles, and are at high risk in the event of a vehicle/bicycle collision. It is frequently difficult for drivers of automobiles, buses and trucks to see bicycle traffic when light levels are low such as at dusk, dawn or at night. Since bicyclists must follow traffic rules, and can not ride against vehicular traffic flow which would permit them to watch and avoid oncoming traffic, the rider is unable to readily keep track of following traffic which unfortunately results in all too frequent automobile-bicycle accidents.

While bicycles are generally equipped with rear reflectors, these stationary lights have been unsatisfactory in solving the visibility problem, and there has remained a long-standing need for an improved rear-mounted bicycle light. The present invention fulfills that need.

Accordingly, it is an object of this invention to provide a bicycle safety light which improves the visibility of the bicycle and rider during periods of low light levels such as at dawn, dusk and at night.

It is a further object of this invention to provide a rear-mounted flashing bicycle light having a battery-powered, reciprocally converging, sequentially patterned light-emitting diode (LED) display which improves the visibility of a bicycle to following traffic.

Another object of this invention is to provide a rear-mounted bicycle light which improves the location recognition of the bicycle to following traffic.

SUMMARY OF THE INVENTION

The present invention provides a rear-mounted bicycle light having a patterned, flashing light display adapted to not only improve the visibility of a bicycle to following traffic, but to more accurately pinpoint the location of the rider and bicycle by drawing the following driver's attention to the central vertical position of the rider and bicycle. In a preferred embodiment, the bicycle light of this invention comprises: a clamp means for fixedly mounting the light to the rear portion of a bicycle and a weather-resistant housing. The clamp means is cooperatively associated with said housing so that the light can be mounted to the rear of a bicycle in the proper orientation. The housing defines a chamber suitable for receiving a battery-powered, LED light-producing assembly. A mounting display plate, which defines the front surface of said housing is characterized by having a multiplicity of spaced-apart orifices disposed in and extending through the display plate to form a series of openings therein. An array of light-emitting diodes is disposed within said housing so that light-emitting ends of each of said diodes is received and fixed within an orifice of said display plate so that in operation, light emitted from each of said diodes is directed outwardly and visibly to following traffic. A predetermined, sequentially formed, reciprocally converging moving light pattern is emitted by said diodes when said bicycle light is in operation. The light pattern repeatedly converges from the outer edges of said plate to a center portion of said plate so as to define and form a perpendicular center coinciding with and defining a perpendicular center of the bicycle and rider so as to accurately pinpoint the location of the bicycle and rider to following traffic.

BRIEF DESCRIPTION OF DRAWINGS

The present invention will be more readily discerned from the following detailed description taken in conjunction with the drawings in which:

FIG. 1 is a perspective view of a preferred embodiment of the safety bicycle light of this invention depicting the light mounted on the verticle seat column of a bicycle;

FIG. 2 is a horizontal cross-sectional view of the light assembly with parts in phantom taken along lines 2—2 of FIG. 1;

FIG. 3 is a vertical cross-sectional view of a preferred embodiment of the light taken along lines 3—3 of FIG. 1; and FIG. 4 is a circuit diagram of the preferred embodiment of the sequentially patterned flashing light assembly.

DESCRIPTION OF PREFERRED EMBODIMENTS

Referring to FIG. 1, light assembly 10 is shown as mounted on bicycle seat column 11 by clamp 12 which adjustably secures and positions housing 13 by means of a swivel bracket (shown in FIG. 2). Foraminous display plate 14 forms the front face of housing 13 and carries a plurality of spaced apart orifices. A light-emitting diode (LED) 15 is positioned within each orifice. Plate 14 also accommodates on-off switch 16. Housing 13 is shown as comprising housing base cup 17 into which is fitted around its periphery housing casing 18. As here depicted, display plate 14 is unitary with housing casing 18. However, in alternate preferred embodiments, plate 14 may be a separate, generally planar element.

The casing is weather-resistant and water-resistant, and may be conveniently formed of high-impact, ultraviolet resistant polymeric material, although metal and other appropriate materials are suitable.

FIG. 2 shows the assembly in horizontal cross-section in which clamp means 12, comprising cooperatively associated outer clamp member 24 and clamp base 25 has adjusting bolt 29 passing through outer clamp member 24 and fastened within the clamp base so as to secure said assembly to the seat column 11. The clamp base 25 carries tongue 26 which is received and secured within yoke arms 27 by swivel bolt 30 passing through mating passageways of the yoke arms 27 and tongue 26. The yoke is fixed to housing base cup 17 which has housing casing 18 sealed within its periphery. Together with forminous display plate 14, the cup and the casing form chamber 23. Housed within the chamber are batteries 21 which are mounted within battery housing 22 and operationally attached to circuit board 20, LEDs 15 and switch 16.

Referring to FIG. 3, arcuate portions 32 and 32a carried on inner surfaces of outer clamp member 24 and clamp base 25 cooperate to frictionally engage bicycle seat column 11. Clamp bolts 29 and 29a adjustably fix the tightness of the clamp. Clamp tongue 26 is positioned within the arms of yoke 27. The housing assembly 13 is adapted to swivel by means of the yoke assembly and is locked in position by swivel cap nut 28 which adjustably applies tension through swivel bolt 30 to the yoke arms and the cooperating clamp tongue. The cup 17 is fixed to housing casing 18 by fastening means 33 and 33a.

FIG. 4 depicts preferred circuitry and components. Referring to FIG. 4, a power supply terminal is connected to the positive pole of an energizing source such as battery 40. When off-on switch 41 is in the on position, current input is selectively supplied to five pairs of banks of light-emitting diodes (LEDs) via lines 43, 44, 45, 46 and 47. In the preferred embodiment, which employs ten banks of LEDs, line 43 connects first bank 48 and tenth bank 49; line 44 connects second bank 50 and ninth bank 51; line 45 connects third bank 52 and eighth bank 53; line 46 connects fourth bank 54 and seventh bank 55; and line 47 connects fifth bank 56 and sixth bank 57.

The selective, timed flow of current to the LED banks is controlled via timer 60 and decade counter 61 which cooperate with transistors 62, 63, 64, 65 and 66. Resistors 70, 71, 72, 73, 74, 75, 76, 77, 78 and 79 complete the control system.

In operation, the safety lamp effects a constantly moving, converging pattern of light rows which visually direct and emphasize to a following viewer the center position of the rider and the bicycle.

Table I below illustrates how a 5 cycle reciprocating light pattern according to the preferred embodiment of the present invention is made to appear to converge to define opposing, parallel vertical lines which emphasize the position of the bicycle and rider.

TABLE I

| Time | Period | Row | | | | | | | | | |
|---|---|---|---|---|---|---|---|---|---|---|---|
| | | 1 | 2 | 3 | 4 | 5 | 6 | 7 | 8 | 8 | 10 |
| 1 | | X | O | O | O | O | O | O | O | O | X |
| 2 | (.2 sec later) | O | X | O | O | O | O | O | O | X | O |
| 3 | (.2 sec later) | O | O | X | O | O | O | O | X | O | O |
| 4 | (.2 sec later) | O | O | O | X | O | O | X | O | O | O |
| 5 | (.2 sec later) | O | O | O | O | X | X | O | O | O | O |

X = Lamp on; O = Lamp off

Tables II–VI illustrate the light pattern for each of the time periods in a single cycle.

TABLE II

| (Period 1) Row | | | | | | | | | |
|---|---|---|---|---|---|---|---|---|---|
| 1 | 2 | 3 | 4 | 5 | 6 | 7 | 8 | 9 | 10 |
| X | O | O | O | O | O | O | O | O | X |
| X | O | O | O | O | O | O | O | O | X |
| X | O | O | O | O | O | O | O | O | X |

TABLE III

| (Period 2) Row | | | | | | | | | |
|---|---|---|---|---|---|---|---|---|---|
| 1 | 2 | 3 | 4 | 5 | 6 | 7 | 8 | 9 | 10 |
| O | X | O | O | O | O | O | O | X | O |
| O | X | O | O | O | O | O | O | X | O |
| O | X | O | O | O | O | O | O | X | O |

TABLE IV

| (Period 3) Row | | | | | | | | | |
|---|---|---|---|---|---|---|---|---|---|
| 1 | 2 | 3 | 4 | 5 | 6 | 7 | 8 | 9 | 10 |
| O | O | X | O | O | O | O | X | O | O |
| O | O | X | O | O | O | O | X | O | O |
| O | O | X | O | O | O | O | X | O | O |

TABLE V

| (Period 4) Row | | | | | | | | | |
|---|---|---|---|---|---|---|---|---|---|
| 1 | 2 | 3 | 4 | 5 | 6 | 7 | 8 | 9 | 10 |
| O | O | O | X | O | O | X | O | O | O |
| O | O | O | X | O | O | X | O | O | O |
| O | O | O | X | O | O | X | O | O | O |

TABLE VI

| (Period 5) Row | | | | | | | | | |
|---|---|---|---|---|---|---|---|---|---|
| 1 | 2 | 3 | 4 | 5 | 6 | 7 | 8 | 9 | 10 |
| O | O | O | O | X | X | O | O | O | O |
| O | O | O | O | X | X | O | O | O | O |
| O | O | O | O | X | X | O | O | O | O |

As can be seen by the above Tables, in the preferred embodiment, opposing or mirror vertical rows of lights are lit, starting with the outmost rows and progressing inwardly to parallel adjacent vertical rows marking the center line of the bicycle and rider.

While a rectangular pattern is depicted, other preferred arrangments include ovoid and diamond shaped LED patterns in which distal lights are fewer in number and the rows progress inwardly in increasing numbers to further emphasize the center point as well as the actual presence of the bicycle.

It will be understood by those skilled in the art that the size and shape of the bicycle light, the number of banks of lights, the number of lights per bank, the time between successive movements of the pattern, and the pattern itself may be varied without departing from the spirit and scope of this invention, so long as the desired effect is achieved.

The invention claimed is:

1. A bicycle safety light which improves the location recognition of the bicycle and the rider to following traffic, said light comprising spaced multiple rows of vertically disposed lights which, when said light is on, and sequentially flash to create a moving light pattern which reciprocally moves in an inward and vertical convergence to terminate in adjacent, centered parallel vertical lines to provide twin, parallel, vertical lamp columns which define the central vertical axial position of the bicycle and rider.

2. The bicycle light of claim 1 in which the lamps are light-emitting diodes.

3. The bicycle light of claim 1 in which the power source for said light is a battery.

4. The bicycle light of claim 2 in which the power source for said lamps is a battery.

5. The bicycle light of claim 1 in which said vertical lamps columns comprise at least three light-emitting diodes and the horizontal rows comprise at least five pairs of light-emitting diodes which are energized in mirrored sequence to converge progressively and repeatedly to a center point.

6. The bicycle light of claim 5 wherein said light is battery-powered.

7. A rear-mounted bicycle light adapted to improve the visibility of a bicycle to following traffic, said bicycle light comprising: clamp means for fixedly mounting said light to the rear portion of a bicycle; a weather-resistant housing, said clamp means cooperatively associated with said housing, said housing defining a chamber suitable for receiving a light-producing assembly; a mounting display plate defining a front surface of said housing; a multiplicity of spaced-apart orifices disposed in and extending through said display plate to form a series of openings therethrough; an array of light-emitting diodes disposed within said housing so that light-emitting ends of each of said diodes is received and fixed within an orifice of said display plate so that in operation, light emitted from each of said diodes is directed outwardly and visibly to following traffic; a predetermined, sequentially formed, moving light pattern emitted by said diodes when said bicycle light is in operation, said light pattern repeatedly converging from the outer edges of said plate to a center portion of said plate; battery means associated with said light-producing assembly; switch means to turn said light on and off cooperating with said battery means; and control means for sequentially activating and deactivating each light-emitting diode in said array to produce said moving light pattern converging to form a perpendicular center coinciding with and defining a perpendicular center of the bicycle and rider so as to accurately pinpoint the location of said bicycle and rider to following traffic.

8. The bicycle light of claim 7 wherein the light pattern formed by said sequentially activated light-emitting diodes forms two converging mirror patterns terminating in an elongated vertical center display in said mounting display plate.

9. The bicycle light of claim 7 wherein said converging mirror patterns terminate in spaced-apart, parallel vertical lines.

10. The bicycle light of claim 7 wherein said housing is a water-resistent, high-impact assembly.

11. The bicycle light of claim 7 wherein said clamp means is adapted to adjustably mount said light on a bicycle.

12. A rear-mounted bicycle light adapted to improve the visibility of a bicycle to following traffic, said bicycle light comprising: clamp means for fixedly mounting said light to the rear portion of a bicycle; a weather-resistant housing, said clamp means cooperatively associated with said housing, said housing defining a chamber suitable for receiving a light-producing assembly; a mounting display plate defining a front surface of said housing; a multiplicity of spaced-apart orifices disposed in and extending through the said display plate to form a series of openings therein; an array of light-emitting diodes disposed within said housing so that light-emitting ends of each of said diodes is received and fixed within an orifice of said display plate so that in operation, light emitted from each of said diodes is directed outwardly and visibly to following traffic; said display plate being substantially rectangular, said light-emitting diodes being disposed within said display plate in ten vertical, spaced apart banks; control means for providing a predetermined, sequentially formed, moving light pattern emitted by said diodes when said bicycle light is in operation, said light pattern repeatedly converging from the outer edges of said plate to a center portion of said plate; battery means associated with said light-producing assembly; switch means to turn said light on and off cooperating with said battery means; and control means for sequentially activating and deactivating each light-emitting diode in said array to produce said moving light pattern converging to form a perpendicular center coinciding with and defining a perpendicular center of the bicycle and rider so as to accurately pinpoint the location of said bicycle and rider to following traffic.

13. The bicycle light of claim 12 wherein said light is powered by a battery.

* * * * *